United States Patent Office 3,265,319
Patented August 9, 1966

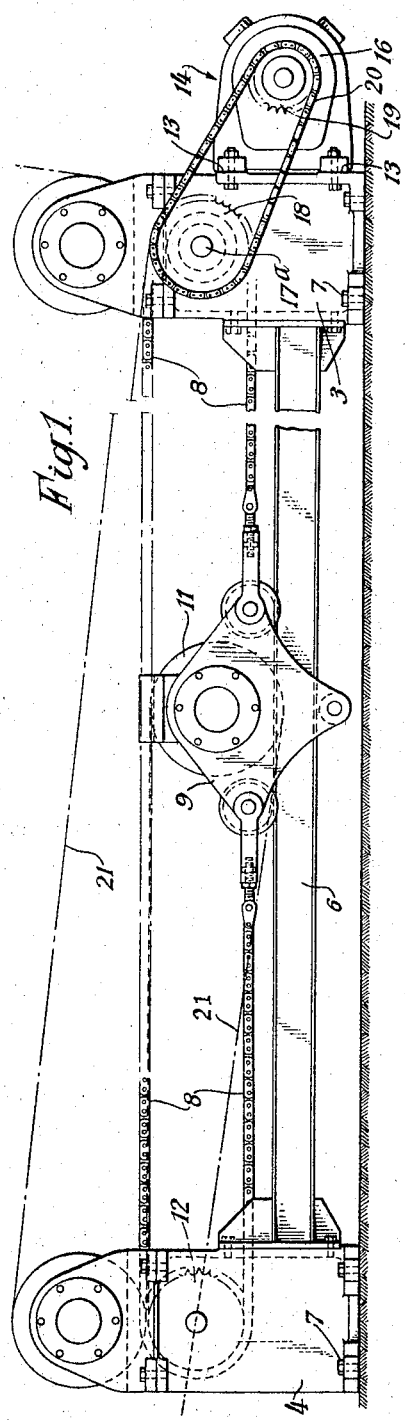

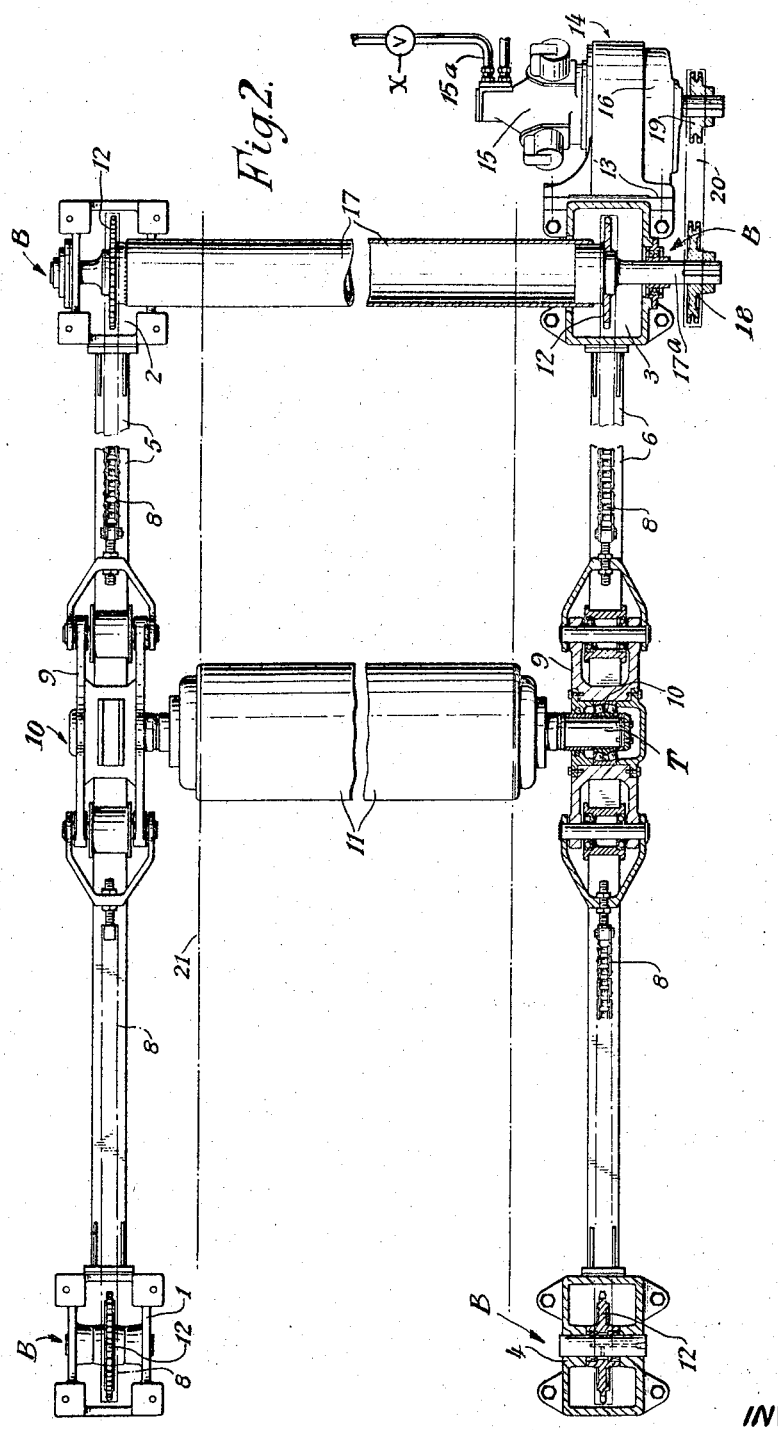

3,265,319
AUTOMATIC TENSIONING APPARATUS
Thomas Hindle and David Dugmore Banks, both of Blackburn, England, assignors to Hindle Son & Co., Limited, Lancashire, England
Filed Apr. 17, 1964, Ser. No. 360,610
Claims priority, application Great Britain, Apr. 19, 1963, 15,595/63
1 Claim. (Cl. 242—753)

This invention pertains to automatic tensioning apparatus useful, for example, for automatically maintaining a substantially constant tension in an endless felt such as is used in a paper-making or like machine, independently of any lengthwise contraction or extension of the felt which may take place during the running of the machine.

It is known for this purpose to arrange a tensioning roller in a bight or fold of the felt customarily used in a paper-making machine and to support such roller in bearings which are connected in endless chains, one at each side of the machine, the two chains passing over sprockets fixedly connected to the opposite ends of a common shaft so as to ensure that the two chains and therefore the two bearings move only in exact synchronism. It has been proposed also to load the said common shaft with a constant torque by means of weights suspended on a cable or the like which lies around a pulley or drum on said common shaft whereby, should the felt counteract and draw the tensioning roll and the said bearings in one direction, the consequent movement of the chain and the rotation of said common shaft which that movement involves will be resisted by said weights and, on the other hand, should the felt enlarge in length, the torque applied to said common shaft by the pull of the weights will rotate said shaft and move the chains so as to advance the tensioning roller and keep it taut against the felt to maintain a tension in the same.

These arrangements have not been wholly satisfactory in that the use of the cable and weights mechanism has involved a good deal of friction which makes the tensioning device sluggish and to some extent variable. Also the task of changing the weights to increase or decrease their load on the felt is not an easy task and, if weights are carelessly applied to the suspension cables, impact shocks may be imparted to the tensioning mechanism which may have deleterious effects.

It is the object of the present invention to provide improvements in this general type of automatic tensioner which render the mechanism free from the above drawbacks, leaving it much smoother and quicker in operation and allowing of the torque load on the said common shaft being very easily varied.

According to this invention the said common shaft is connected by suitable transmission means (usually a chain and sprockets) with the drive shaft of an air motor, and such air motor is arranged to be under a constant driving load, a valve of conventional type being provided to vary that normally constant load from time to time according to requirements. The arrangement is such that with the felt at any particular length, the air motor is stalled, against the resistance of the driving air, but it applies a constant torque to said common shaft thus keeping the bearing-carrying chains under stress with the tensioning roller up against the felt.

By providing a conventional relieving-type regulatory valve in the air feed pipe to the motor, the output torque of the motor may be varied, thus varying the degree of constant tension which the felt is to have when the tensioning means is in equilibrium.

One example of the carrying out of the invention is illustrated in the accompanying drawing, in which:

FIG. 1 is a side view of the improved automatic tensioning arrangement; and

FIG. 2 is a part-sectional plan of the same.

As shown, there are four hollow corner posts, 1, 2, 3, 4 the posts 1 and 2 being braced together by an L-sectional girder 5 and the posts 3 and 4 being braced together by a similar girder 6. The four posts are adapted to be secured to a suitable support or foundation by the bolts 7. At each side of the arrangement thus formed there is a chain 8 which includes within its length an assembly 9 carrying a bearing 10 for the shaft T of the felt-tensioning roller 11. The chains pass over sprockets 12 mounted on shafts which turn in bearings B in the said corner posts, all as in known manner.

However, according to the present invention the corner post 3 is formed with or has provided for it, vertical facings 13 to which is bolted the casing 14 of a combined air motor 15 and reduction gear 16. A conventional valve X varies the load of the motor 15.

At that end of the apparatus the sprockets 12 of the two chains 8 are fixedly secured to a common cross shaft 17 so that the chains 8 can move only in synchronism with each other, and one end of this shaft 17 has an extending trunnion 17ª carrying a chain sprocket 18 which is aligned with a corresponding sprocket 19 on the output shaft of the said reduction gear 16, these sprockets 18 and 19 being encircled by a chain 20.

In the arrangements shown, any shortening of the felt 21 involves a movement of the tensioning roller 11 to the left (in FIG. 1) which involves the rotation of the common shaft 17 and sprocket 18 in a clockwise direction. This causes the sprocket 18 to drive the air motor in a reverse direction, against the resistance of the driving air, at constant pressure, entering at the port 15ª. On the other hand, should the felt 21 stretch, the tensioning roller 11 is relieved of felt tension and immediately the drive on the motor 15 causes the sprocket 18 and common shaft 17 to rotate in a counter-clockwise direction (FIG. 1) which, by pulling on the chains 8 moves the tensioning roller 11 to the right, thereby maintaining a substantially constant tension in the felt itself. When the tensioning means is in equilibrium, the motor 15 although under load is stalled.

What we claim is:

Tensioning apparatus comprising two endless chains, a pair of spaced parallel chain-supporting shafts, bearings for said shafts, fixed supports for said bearings, spaced sprockets fixed to the respective shafts and which are embraced by the respective chains and so arranged as to define parallel runs of the chains which are spaced apart a distance exceeding the width of the material to be tensioned, each of said parallel chain-runs including an assembly comprising a shaft bearing, the assemblies being so relatively located that the shaft bearings are coaxial, a shaft having its axis parallel to the chain-supporting shafts and its end portions arranged in turn in the bearings comprised in the assemblies, a tension roll fixed to said last-named shaft intermediate its end portions, one of the chain-supporting shafts extending outwardly beyond its bearing and a sprocket fixed to said outwardly extending portion of the shaft, a fluid pressure motor of the kind which has a rotary output shaft, means fixedly securing said motor to one of the shaft-bearing supports in such position that its output shaft is parallel to the chain-supporting shafts, a sprocket fixed to the motor shaft, an endless chain embracing the sprocket on the motor shaft and the sprocket on the outwardly extending end portion of the chain-supporting shaft, a conduit operative to supply pressure fluid from a source to the inlet of the motor, and automatic regulating valve means normally operative to maintain a constant fluid pressure at the intake of the motor, said regulating valve means being manually adjustable whereby to set it for maintaining various selected pressures.

References Cited by the Examiner

UNITED STATES PATENTS

| 1,100,039 | 6/1914 | Tyler et al. | 242—75.3 |
| 1,410,136 | 3/1922 | Stevens | 242—75.3 |
| 1,946,264 | 2/1934 | Baer | 242—75.3 |

STANLEY N. GILREATH, *Primary Examiner.*

MERVIN STEIN, *Examiner.*

N. L. MINTZ, *Assistant Examiner.*